(12) United States Patent
Nelson (10) Patent No.: US 12,463,509 B2
(45) Date of Patent: Nov. 4, 2025

(54) STATOR CARRIER FOR A DRIVE UNIT

(71) Applicant: Schaeffler Technologies AG & Co. KG, Herzogenaurach (DE)

(72) Inventor: Kyle Nelson, Wadsworth, OH (US)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 209 days.

(21) Appl. No.: 18/347,205

(22) Filed: Jul. 5, 2023

(65) Prior Publication Data

US 2025/0015684 A1  Jan. 9, 2025

(51) Int. Cl.
*H02K 15/02* (2025.01)
*H02K 1/18* (2006.01)

(52) U.S. Cl.
CPC .............. *H02K 15/02* (2013.01); *H02K 1/18* (2013.01)

(58) Field of Classification Search
CPC ........... H02K 9/12; H02K 9/00; H02K 15/02; H02K 1/18
USPC ........................................ 310/52, 54, 57, 91
See application file for complete search history.

(56) References Cited

U.S. PATENT DOCUMENTS

| | | |
|---|---|---|
| 2016/0348775 A1 | 12/2016 | Schumann et al. |
| 2019/0005448 A9 | 1/2019 | Andres et al. |
| 2019/0334394 A1 | 10/2019 | Messner et al. |
| 2020/0143986 A1 | 5/2020 | Aronet |
| 2023/0013463 A1 | 1/2023 | Krais et al. |

FOREIGN PATENT DOCUMENTS

| | | | | |
|---|---|---|---|---|
| CN | 104037984 B | * | 11/2018 | ............... H02K 5/20 |
| DE | 102021121357 A1 | * | 2/2023 | |
| EP | 3073618 A1 | * | 9/2016 | ............... H02K 5/18 |
| EP | 3621183 A1 | * | 3/2020 | ............... H02K 1/12 |
| JP | H06253496 A | * | 9/1994 | |
| WO | WO-7901024 A1 | * | 11/1979 | |

* cited by examiner

*Primary Examiner* — Jose A Gonzalez Quinones
(74) *Attorney, Agent, or Firm* — Price Heneveld LLP (57) ABSTRACT

A method of manufacturing a stator carrier includes the step of fashioning a stator carrier body that includes a side wall that extends circumferentially about a hollow. The side wall has an interior surface that defines the hollow and an exterior surface opposite the interior surface. The method of manufacturing the stator carrier further includes the step of, subsequently, providing a fin on the exterior surface of the side wall of the stator carrier body. The fin is coupled to the exterior surface of the side wall and extends axially and circumferentially along the exterior surface of the of the side wall in a winding fashion.

20 Claims, 8 Drawing Sheets

STATOR CARRIER FOR A DRIVE UNIT

FIELD OF THE DISCLOSURE

The present disclosure generally relates to a stator carrier. More specifically, the present disclosure relates to a stator carrier for an electric drive unit of a vehicle.

BACKGROUND OF THE DISCLOSURE

Electric drive units often include stator carriers. A fin that may be coupled to an exterior surface of a side wall of a stator carrier body may be desired.

SUMMARY OF THE DISCLOSURE

According to a first aspect of the present disclosure, a method of manufacturing a stator carrier includes the step of fashioning a stator carrier body that includes a side wall that extends circumferentially about a hollow. The side wall has an interior surface that defines the hollow and an exterior surface opposite the interior surface. The method of manufacturing the stator carrier further includes the step of, subsequently, providing a fin on the exterior surface of the side wall of the stator carrier body. The fin is coupled to the exterior surface of the side wall and extends axially and circumferentially along the exterior surface of the of the side wall in a winding fashion.

Embodiments of the first aspect of the disclosure can include any one or a combination of the following features:
- the fin includes a spring, and the step of providing a fin on the exterior surface of the side wall of the stator carrier body comprises positioning the spring about the exterior surface of the side wall such that the spring is wound about the exterior surface of the side wall;
- an outer diameter of the exterior surface of the side wall is greater than an inner diameter of the spring in an undeformed state of the spring, and the spring is positioned about the exterior surface of the side wall via elastic deformation of the spring;
- the step of providing a fin on the exterior surface of the side wall further includes brazing the spring to the exterior surface of the side wall of the stator carrier body;
- the step of providing a fin on the exterior surface of the side wall further includes welding the spring to the exterior surface of the side wall of the stator carrier body;
- the step of providing a fin on the exterior surface of the side wall includes depositing a bead of filler metal onto the exterior surface of the side wall;
- the step of machining the bead of filler metal;
- the step of fashioning the stator carrier body includes stamping at least one metal component; and
- the fin includes a first portion that extends in a winding fashion circumferentially in a first circumferential direction and axially toward a flange of the stator carrier body that extends radially outboard from the side wall, a second portion that extends axially from the first portion toward the flange of the stator carrier, and a third portion that extends from the second portion circumferentially about the exterior surface of the side wall a second circumferential direction that is opposite the first circumferential direction.

According to a second aspect of the present disclosure, a stator carrier includes a stator carrier body that includes a side wall that extends circumferentially about a hollow. The side wall has an interior surface that defines the hollow and an exterior surface opposite the interior surface. The stator carrier further includes a spring coupled to the exterior surface of the side wall and extending axially and circumferentially along the exterior surface of the of the side wall in a winding fashion.

Embodiments of the second aspect of the disclosure can include any one or a combination of the following features:
- the spring is in an elastically deformed state, and an outer diameter of the exterior surface of the side wall along which the spring extends in the elastically deformed state is greater than an inner diameter of the spring in an undeformed state of the spring;
- interference between the spring and the exterior surface of the side wall of the stator carrier due to the spring being resiliently biased toward undeformed state yieldingly maintains the position of the spring relative to the stator carrier body;
- the spring is coupled to the exterior surface of the side wall via brazing;
- the spring is welded to the exterior surface of the side wall;
- the spring includes a first portion that extends in a winding fashion axially and circumferentially in a first circumferential direction, a second portion that extends axially away from the first portion, and a third portion that extends from the second portion circumferentially about the exterior surface of the side wall a second circumferential direction that is opposite the first circumferential direction;
- the first portion of the spring extends axially toward a flange of the stator carrier body that extends radially outboard from the side wall of the stator carrier body, and the second portion of the spring extends axially toward the flange of the stator carrier body; and
- the stator carrier body includes at least one stamped metal component.

According to a third aspect of the present disclosure, a stator carrier includes a stator carrier body that includes a side wall that extends circumferentially about a hollow. The side wall has an interior surface that defines the hollow and an exterior surface opposite the interior surface. The stator carrier further includes a bead of filler metal coupled to the exterior surface of the side wall and extending axially and circumferentially along the exterior surface of the of the side wall in a winding fashion.

Embodiments of the third aspect of the disclosure can include any one or a combination of the following features:
- at least a portion of the bead of filler metal has a machined outer profile; and
- the stator carrier body includes at least one stamped metal component, and the bead of filler metal is fixed to the at least one stamped metal component.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a rotor shaft configured to rotate in operation of the apparatus described herein. Further, the term "radial" and derivatives thereof, such as "radially," shall be understood in relation to the axis of the aforementioned rotor shaft. For example, "radially outboard" refers to further away from the axis, while "radially inboard" refers to nearer to the axis. The term "circumferential" and derivatives thereof, such as "circumferentially," shall be understood in relation to the axis of the aforementioned rotor shaft.

Referring now to FIGS. 1-8, a stator carrier 10 includes a stator carrier body 12. The stator carrier body 12 includes a side wall 14 that extends circumferentially about a hollow 16. The side wall 14 includes an interior surface 18 that defines the hollow 16 and an exterior surface 20 that is opposite the interior surface 18. A fin 22 is coupled to the exterior surface 20 of the side wall 14. The fin 22 extends axially and circumferentially along the exterior surface 20 of the side wall 14 in a winding fashion.

Figure 1:
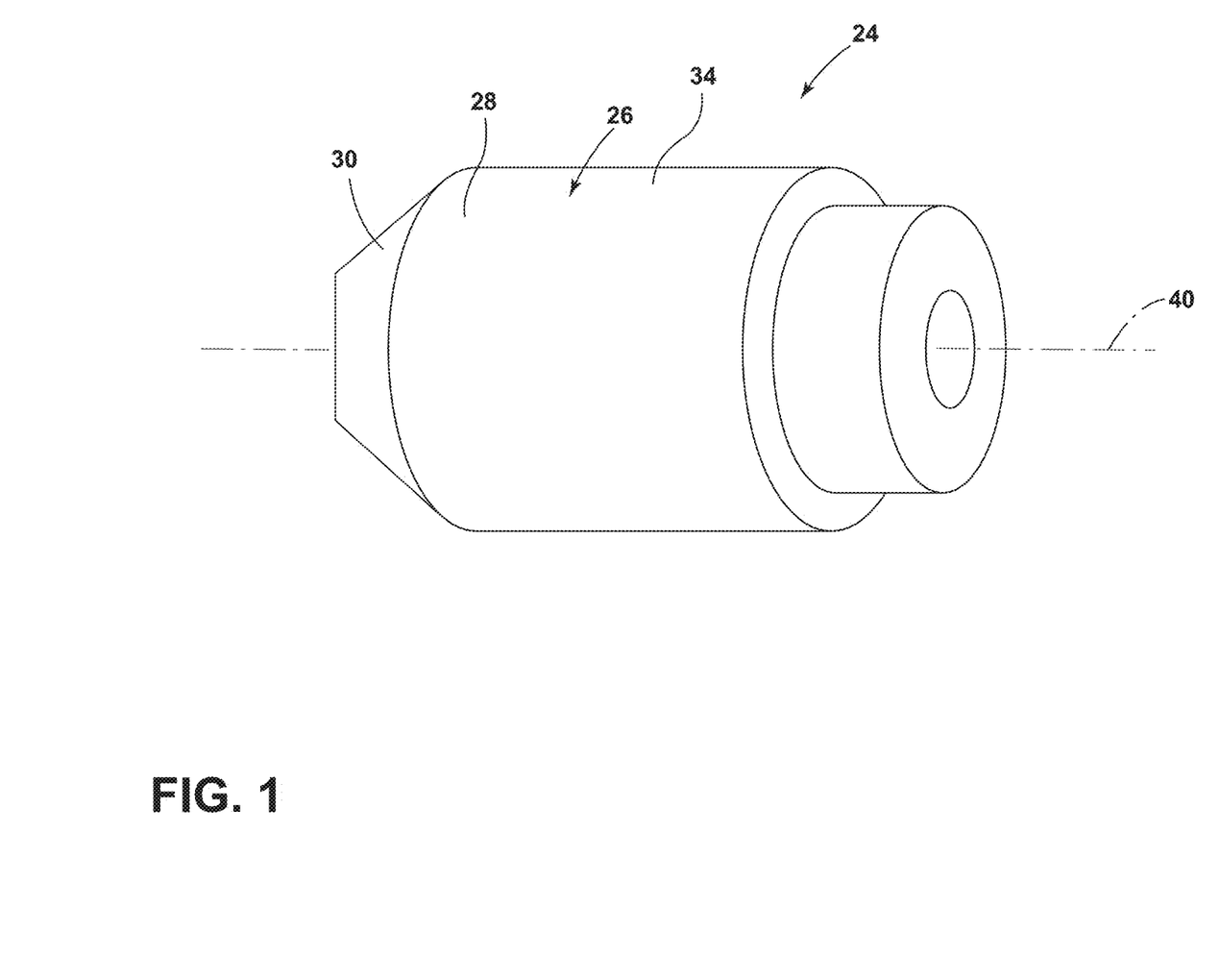
FIG. 1 is a side perspective view of an electric drive unit.
Figure 2:
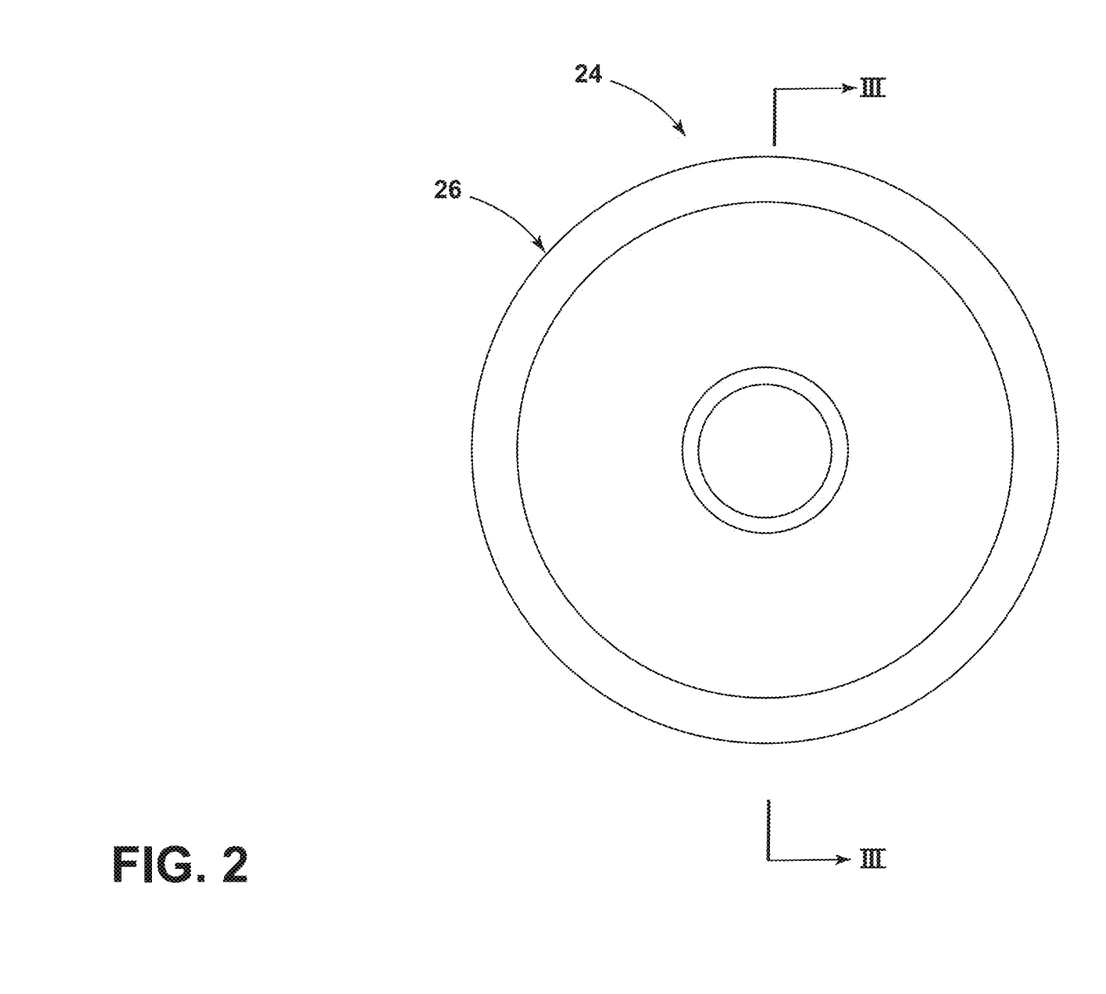
FIG. 2 is a side elevational view of an electric drive unit.
Figure 3:
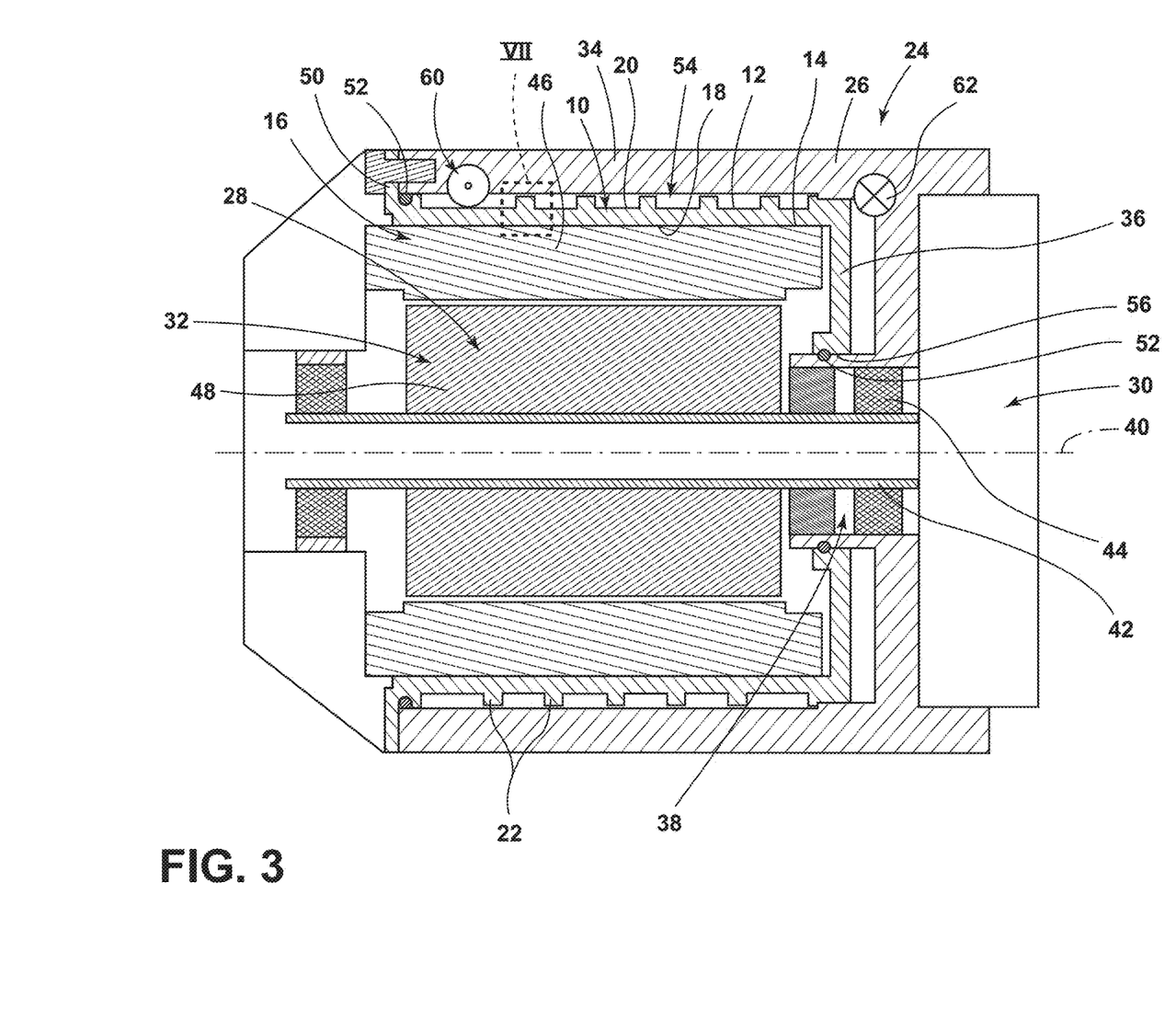
FIG. 3 is a cross-sectional view of the electric drive unit of FIG. 2 taken at line III-III, illustrating a stator carrier disposed within a housing of the electric drive unit.
Figure 4:
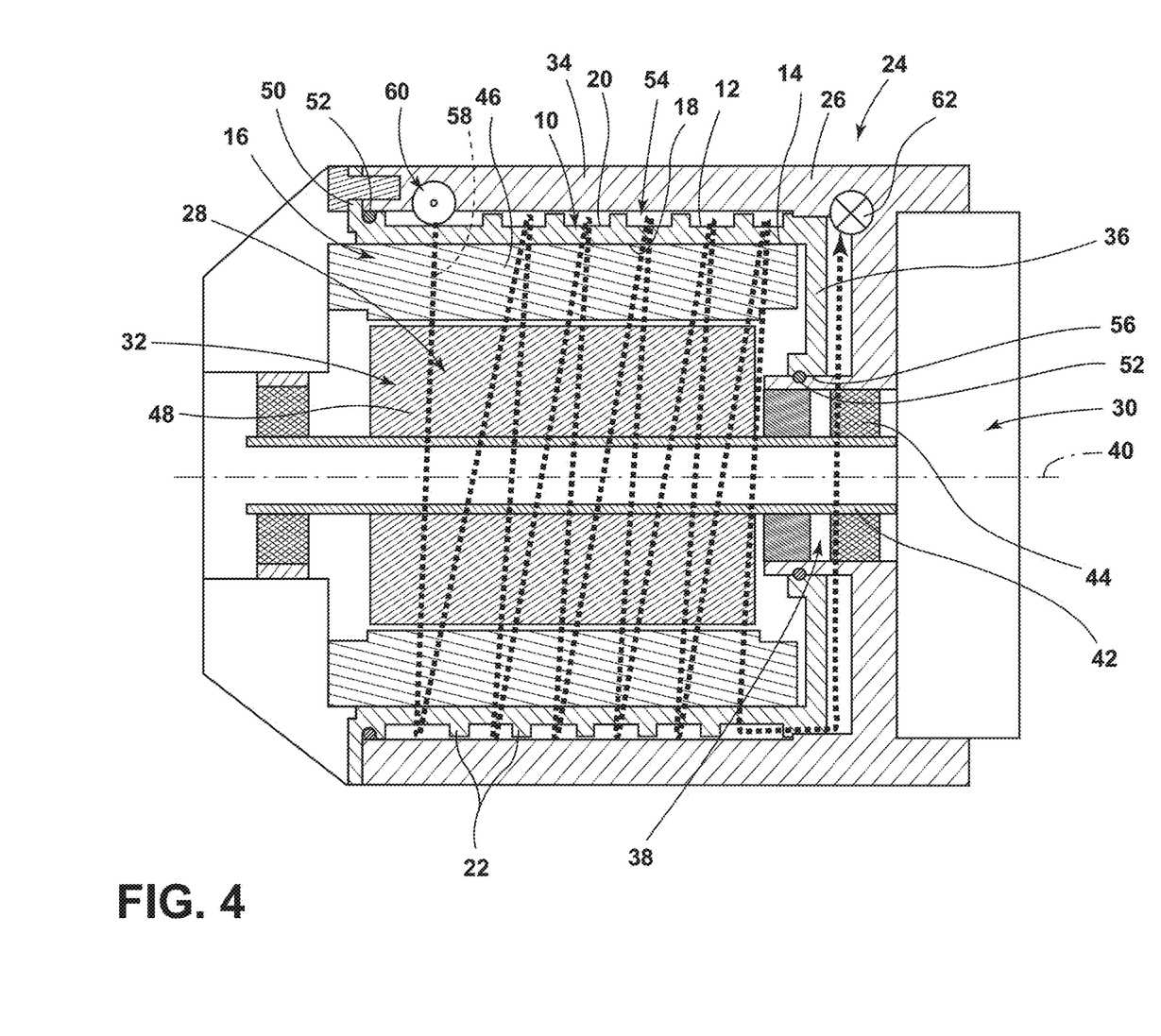
FIG. 4 is a cross-sectional view of an electric drive unit, illustrating a flow path of fluid within a fluid jacket that is defined by a housing of the electric drive unit and a stator carrier of the electric drive unit.

Referring now to FIGS. 1-3, an electric drive unit 24 is illustrated. The electric drive unit 24 includes a housing 26. The housing 26 can be an assembly of a plurality of components, in some examples. For example, the housing 26 can be a die-cast aluminum housing 26 that is formed of a plurality of components. The housing 26 can define a motor region 28 and a gearbox region 30. A motor 32 of the electric drive unit 24 can be housed within the motor region 28. The gearbox region 30 defined by the housing 26 can contain a plurality of electric drive unit components, such as a gearset and a differential (not shown). Further, the gearbox region 30 may serve as a reservoir for oil. The housing 26 includes an outer wall 34. The outer wall 34 can extend generally circumferentially about the motor 32 of the electric drive unit 24. The housing 26 can further include a bearing shield 36. The bearing shield 36 may extend radially inboard from the outer wall 34 and may be arranged to separate the oil cavity of the gearbox region 30 from the dry cavity of the motor region 28. As illustrated in FIG. 3, the bearing shield 36 can define a central aperture 38. An axis 40 about which a rotor shaft 42 of the motor 32 is configured to rotate, as described further herein, may extend through the central aperture 38, in various embodiments. As illustrated in FIG. 3, a bearing 44 may be positioned radially between the bearing shield 36 and the rotor shaft 42 of the motor 32, as illustrated in FIG. 4. The bearing 44 may support and facilitate rotation of the rotor shaft 42 about the axis 40.

Referring now to FIG. 3, the electric drive unit 24 includes the motor 32. The motor 32 includes a stator 46, a rotor 48, and the rotor shaft 42. In an exemplary embodiment, operation of the motor 32 drives rotation of the rotor shaft 42 about the axis 40, which may drive first and second output shafts (not shown) that are operably coupled to the rotor 48 via a gearset and differential (not shown) disposed within the gearbox region 30 defined by the housing 26. In various implementations, the first and second output shafts may be operably coupled with wheels of a vehicle, such that operation of the motor 32 is configured to effect movement of the vehicle. It is contemplated that the electric drive unit 24 may be used in a variety of types of vehicles, such as an electric vehicle or a hybrid electric vehicle. In various implementations, the electric drive unit 24 may be a portion of an E-axle assembly of a vehicle. As illustrated in FIG. 3, the rotor shaft 42 is positioned radially inboard of the rotor 48 and the stator 46 and extends axially through the rotor 48 of the motor 32. Further, the stator 46 is disposed within the housing 26 radially inboard of the outer wall 34 of the housing 26.

Referring now to FIGS. 3 and 4, the stator carrier 10 is operably coupled with the stator 46. The stator carrier 10 includes the stator carrier body 12. The stator carrier body 12 includes the side wall 14. The side wall 14 extends circumferentially about the hollow 16. The interior surface 18 of the side wall 14 of the stator carrier body 12 defines the hollow 16. The side wall 14 includes the exterior surface 20 that is opposite the interior surface 18 of the side wall 14. The stator carrier body 12 can include a flange 50 that extends radially outboard from the side wall 14 of the stator carrier body 12. As illustrated in FIG. 3, the flange 50 extends radially outboard from an end of the side wall 14 of the stator carrier body 12 that is axially distal from the gearbox region 30 defined by the housing 26 As illustrated in FIG. 3, a seal 52 may extend between the outer wall 34 of the housing 26 and the stator carrier body 12 proximate to the flange 50 of the stator carrier body 12. The seal 52 may aid in sealing a fluid jacket 54 that is defined by the outer wall 34 of the housing 26 and the stator carrier 10, as described further herein.

Referring still to FIGS. 3 and 4, the stator carrier body 12 may include a portion that extends radially inboard from the side wall 14 of the stator carrier body 12. In the embodiment illustrated in FIG. 3, a portion of the stator carrier body 12 extends radially inboard from a portion of the side wall 14 that is proximal to the gearbox region 30 defined by the housing 26 to a radially inboard terminus 56 of the stator carrier body 12. In the illustrated embodiment, a seal 52 is disposed between the radially inboard terminus 56 and a portion of the bearing shield 36 of the housing 26. It is contemplated that the stator carrier body 12 may omit the portion that extends radially inboard from the side wall 14, in various embodiments.

Referring still to FIGS. 3 and 4, in various implementations, the stator carrier 10 includes the fin 22. The fin 22 may be coupled to the exterior surface 20 of the side wall 14 of the stator carrier body 12. In various implementations, the fin 22 extends axially and circumferentially along the exterior surface 20 of the side wall 14 of the stator carrier body 12 in a winding fashion. The fin 22 may be configured to deliver fluid through the fluid jacket 54 in a cork screwing manner, as described further herein.

Referring still to FIGS. 3 and 4, the stator 46 is positioned within the hollow 16 defined by the interior surface 18 of the side wall 14 of the stator carrier body 12. In various implementations, the stator 46 can be coupled to the interior surface 18 of the side wall 14 of the stator carrier body 12, via, for example, a shrink fit arrangement.

Referring now to FIG. 4, the housing 26 and the stator carrier 10 define the fluid jacket 54. The fluid jacket 54 is configured to convey fluid for removal of heat from the electric drive unit 24. In various embodiments, the fluid jacket 54 is a portion of a fluid circuit 58 through which fluid is cyclically circulated. In the embodiment illustrated in FIG. 4, the electric drive unit 24 includes a fluid inlet 60 that conveys fluid into the fluid jacket 54 and a fluid outlet 62 that conveys fluid out of the fluid jacket 54. In an exemplary embodiment, the fluid is a water-glycol mixture; however, other fluids may be utilized, in various implementations. The fluid that flows within the fluid circuit 58, and more particularly the fluid jacket 54, may be configured to cool various components of the electric drive unit 24 and/or other fluids utilized in the electric drive unit 24. In the embodiment illustrated in FIG. 4, fluid flowing within the fluid circuit 58 is conveyed into the fluid jacket 54 via the fluid inlet 60. The fluid then spirals about the exterior surface 20 of the side wall 14 of the stator carrier body 12 along the winding fin 22 that is coupled to the exterior surface 20. The fluid is then conveyed out of the fluid jacket 54 via the fluid outlet 62.

Figure 5:
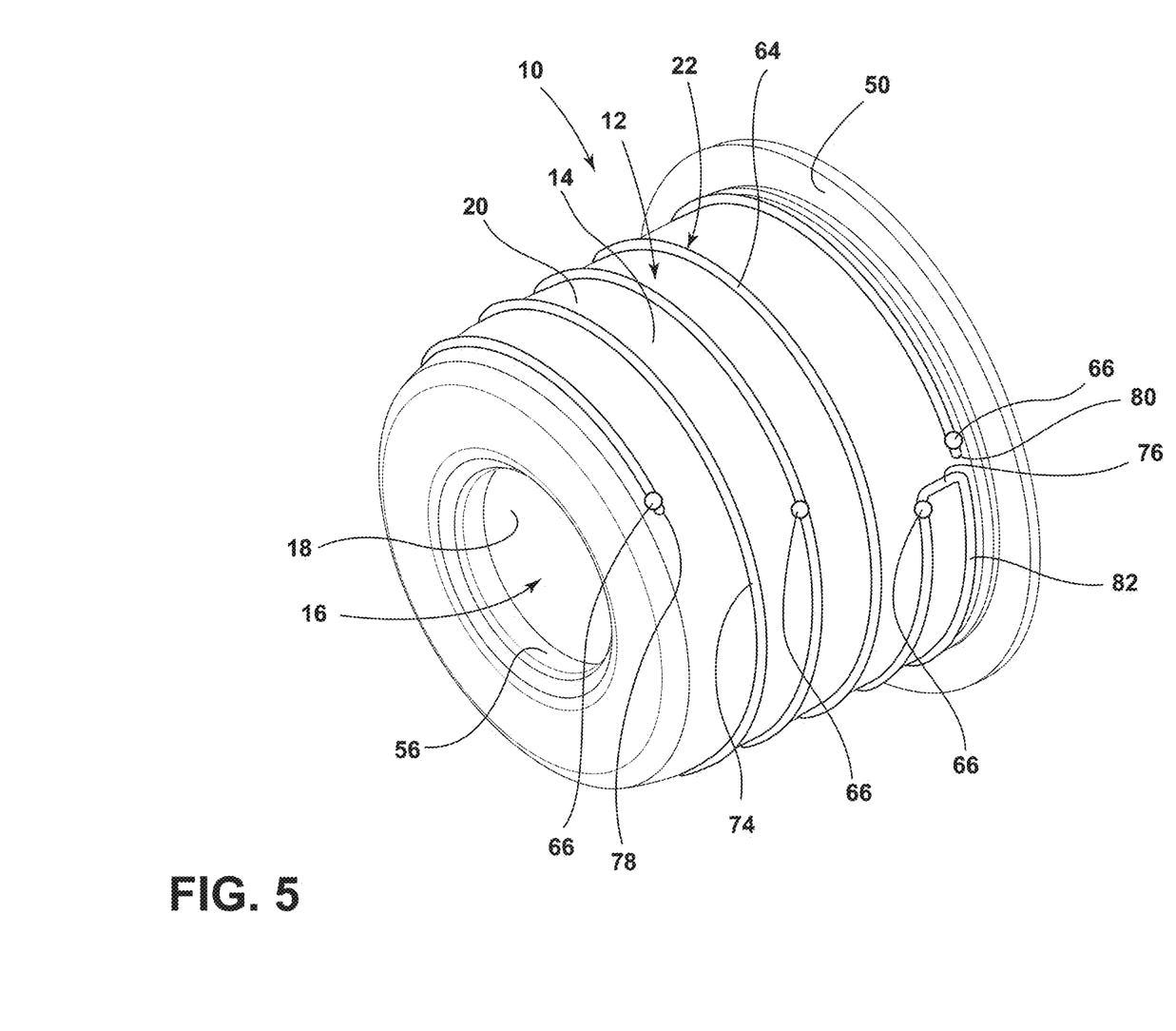
FIG. 5 is a top perspective view of a stator carrier, illustrating a stator carrier body that includes a side wall, and a spring that extends axially and circumferentially about an exterior surface of the side wall.

Referring now to FIG. 5, in some implementations, the fin 22 coupled to the stator carrier body 12 may be a spring 64. In the embodiment illustrated in FIG. 5, the fin 22 comprises a spring 64 that is coupled to the exterior surface 20 of the side wall 14 of the stator carrier 10. The spring 64 extends axially and circumferentially along the exterior surface 20 of the side wall 14 in a winding fashion. In some implementations, the spring 64 that is coupled to the exterior surface 20 of the side wall 14 is in an elastically deformed state while coupled to the exterior surface 20 of the side wall 14. The spring 64 may be operable between the elastically deformed state and an undeformed state. In the undeformed state of the spring 64, the inner diameter of the spring 64 may be smaller than the inner diameter of the spring 64 in the elastically deformed state of the spring 64. The outer diameter of the exterior surface 20 of the side wall 14 of the stator carrier body 12 may be greater than the inner diameter of the spring 64 in the undeformed state of the spring 64. The spring 64 may be maintained in the elastically deformed state via contact with the exterior surface 20 of the side wall 14. In various implementations, interference between the spring 64 and the exterior surface 20 of the side wall 14 of the stator carrier 10 occurs due to the spring 64 being resiliently biased toward the undeformed state. The interference between the spring 64 and the exterior surface 20 of the side wall 14 due to the spring 64 being resiliently biased toward the undeformed state may yieldingly maintain the position of the spring 64 relative to the stator carrier body 12.

In some implementations, the spring 64 may be fixedly coupled to the exterior surface 20 of the side wall 14 via brazing. For example, the spring 64 may be coupled to the exterior surface 20 of the side wall 14 via copper brazing along a length of the spring 64. In some implementations, the spring 64 may be coupled to the exterior surface 20 of the side wall 14 of the stator carrier body 12 via welding. For example, as illustrated in FIG. 5, the spring 64 is tack welded to the exterior surface 20 of the side wall 14 at specific locations 66, as described further herein. It is contemplated that the spring 64 may be coupled to the exterior surface 20 of the side wall 14 of the stator carrier body 12 in a variety of manners, in various embodiments.

Figure 6:
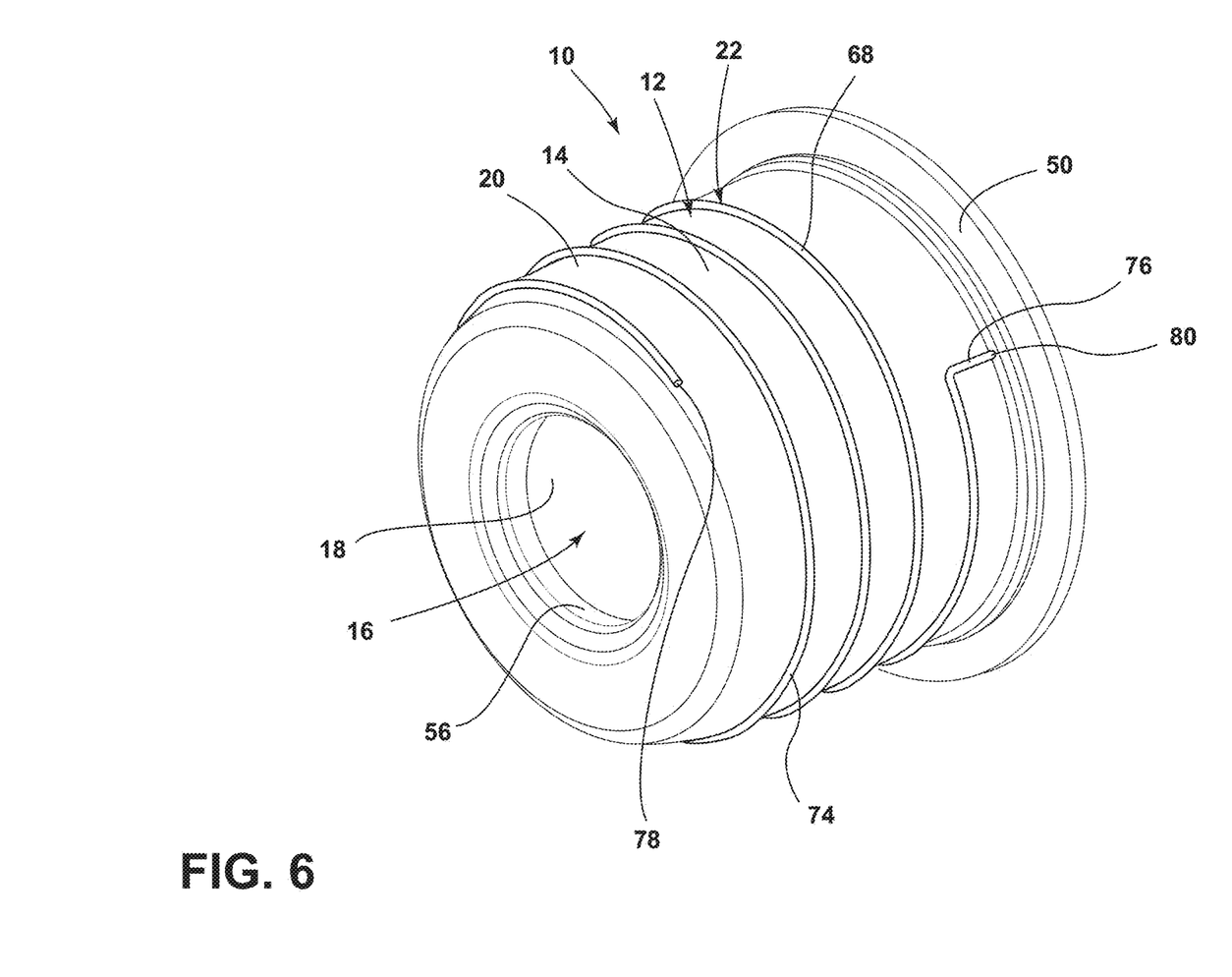
FIG. 6 is a top perspective view of a stator carrier, illustrating a stator carrier body that includes a side wall, and a bead of filler metal that is coupled to an exterior surface of the side wall and extends circumferentially and axially along the exterior surface of the side wall.
Figure 7:
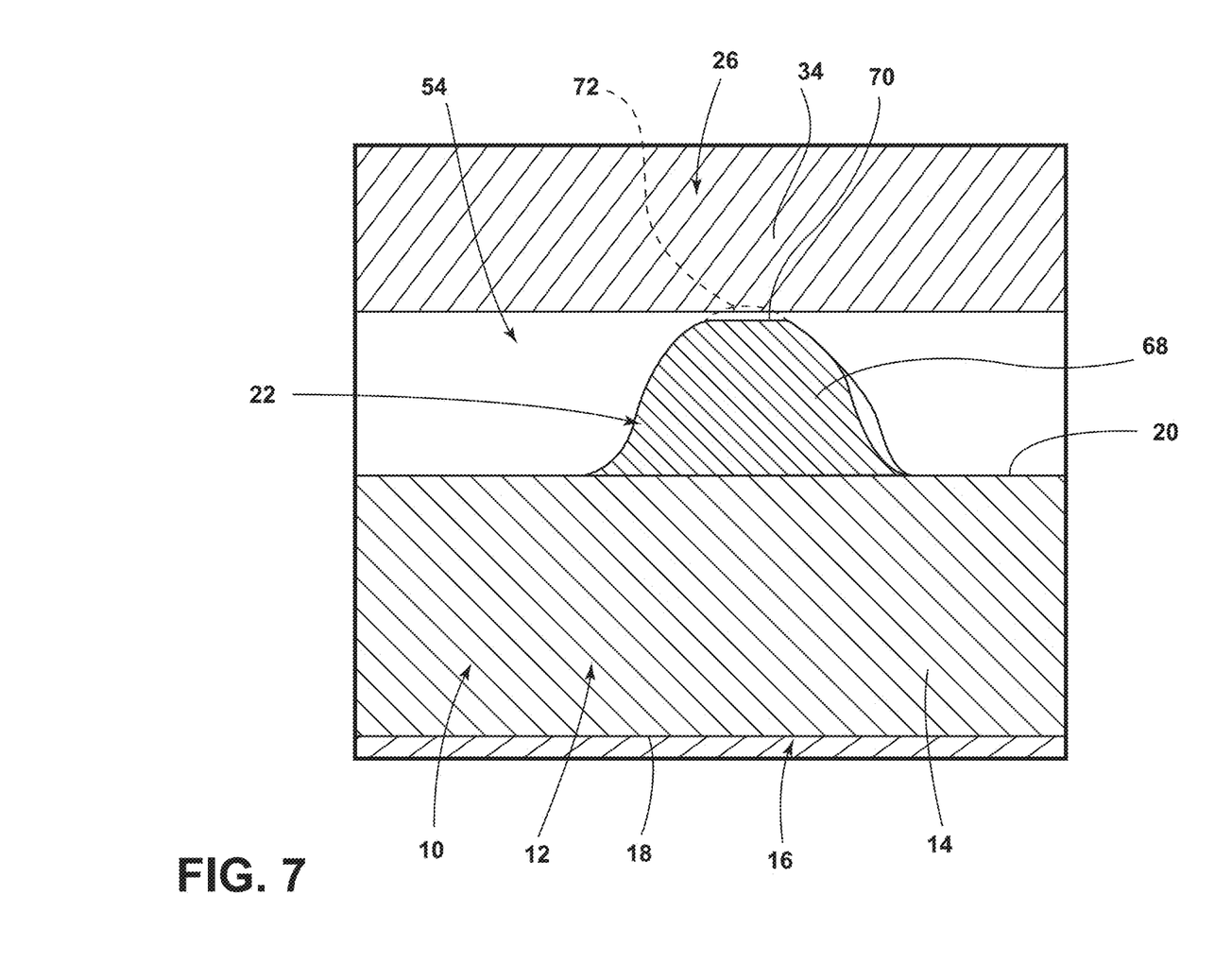
FIG. 7 is an enlarged view of area VII of FIG. 3, illustrating a machined outer profile of a portion of a bead of filler metal that is coupled to a stator carrier body.

Referring now to FIGS. 6 and 7, in some embodiments, the fin 22 of the stator carrier 10 may comprise a bead 68 of filler metal. The bead 68 of filler metal may be applied via a welding torch that heats and applies the bead 68 of filler metal. A variety of types of metals are contemplated. As illustrated in FIG. 6, the bead 68 of filler metal is coupled to the exterior surface 20 of the side wall 14 of the stator carrier body 12 and extends axially and circumferentially along the exterior surface 20 of the side wall 14 in a winding fashion. In some implementations, the bead 68 of filler metal coupled to the exterior surface 20 of the side wall 14 has a machined outer profile 70. In other words, at least a portion of the outer profile 70 of the bead 68 is cut to a given shape and/or size by a controlled material-removal process. In the embodiment illustrated in FIG. 7, the bead 68 of filler metal has a machined outer profile 70 that is in a spaced-relationship with the outer wall 34 of the housing 26. The space between the machined outer profile 70 of the bead 68 and the outer wall 34 of the housing 26 may be optimized, such that fluid flowing through the fluid jacket 54 flows at a desired rate. In the embodiment illustrated in FIG. 7, the portion 72 of the bead 68 that was removed to reveal the machined outer profile 70 of the bead 68 is illustrated in phantom.

Referring now to FIGS. 5 and 6, in various implementations, the fin 22 of the stator carrier 10 includes a first portion 74 that extends in a winding fashion axially and circumferentially in a first circumferential direction, and a second portion 76 that extends axially away from the first portion 74. For example, as illustrated in FIG. 6, the bead 68 of filler metal includes the first portion 74 that extends from a first end 78 of the bead 68 in a winding fashion circumferentially in a first circumferential direction and axially toward the flange 50 of the stator carrier body 12 and the second portion 76 that extends axially from the first portion 74 toward the flange 50 of the stator carrier body 12 to a second end 80 of the bead 68.

Referring still to FIGS. 5 and 6, in some implementations, the fin 22 of the stator carrier 10 includes the first portion 74 that extends in a winding fashion axially and circumferentially in a first circumferential direction, the second portion 76 that extends axially away from the first portion 74, and a third portion 82 that extends from the second portion 76 circumferentially about the exterior surface 20 of the side wall 14 a second circumferential direction that is opposite the first circumferential direction. For example, as illustrated in FIG. 5, the fin 22 comprises the spring 64. The spring 64 includes the first portion 74 that extends from the first end 78 of the spring 64 that is distal from the flange 50 of the stator carrier body 12. The first portion 74 of the spring 64 extends in a winding fashion circumferentially in a first circumferential direction and axially toward the flange 50 of the stator carrier body 12. The spring 64 includes the second portion 76 that extends axially from the first portion 74 toward the flange 50 of the stator carrier 10. Further, the spring 64 includes the third portion 82 that extends from the second portion 76 circumferentially about the exterior surface 20 of the side wall 14 a second circumferential direction that is opposite the first circumferential direction. The third portion 82 extends from the second portion 76 to the second end 80 of the spring 64.

As illustrated in FIG. 5, the spring 64 is tack welded to the exterior surface 20 of the side wall 14 of the stator carrier body 12 at a plurality of locations. In the illustrated embodiment, the stator carrier body 12 and the spring 64 are tack welded together proximate to the first end 78 of the spring 64, proximate to the second end 80 of the spring 64, proximate to a corner of the spring 64 wherein the first portion 74 of the spring 64 and the second portion 76 of the spring 64 meet, and at a portion of the spring 64 between the first end 78 of the spring 64 and the second portion 76 of the spring 64. It is contemplated that the spring 64 may be tack welded to the exterior surface 20 of the side wall 14 at a variety of portions of the spring 64.

Figure 8:
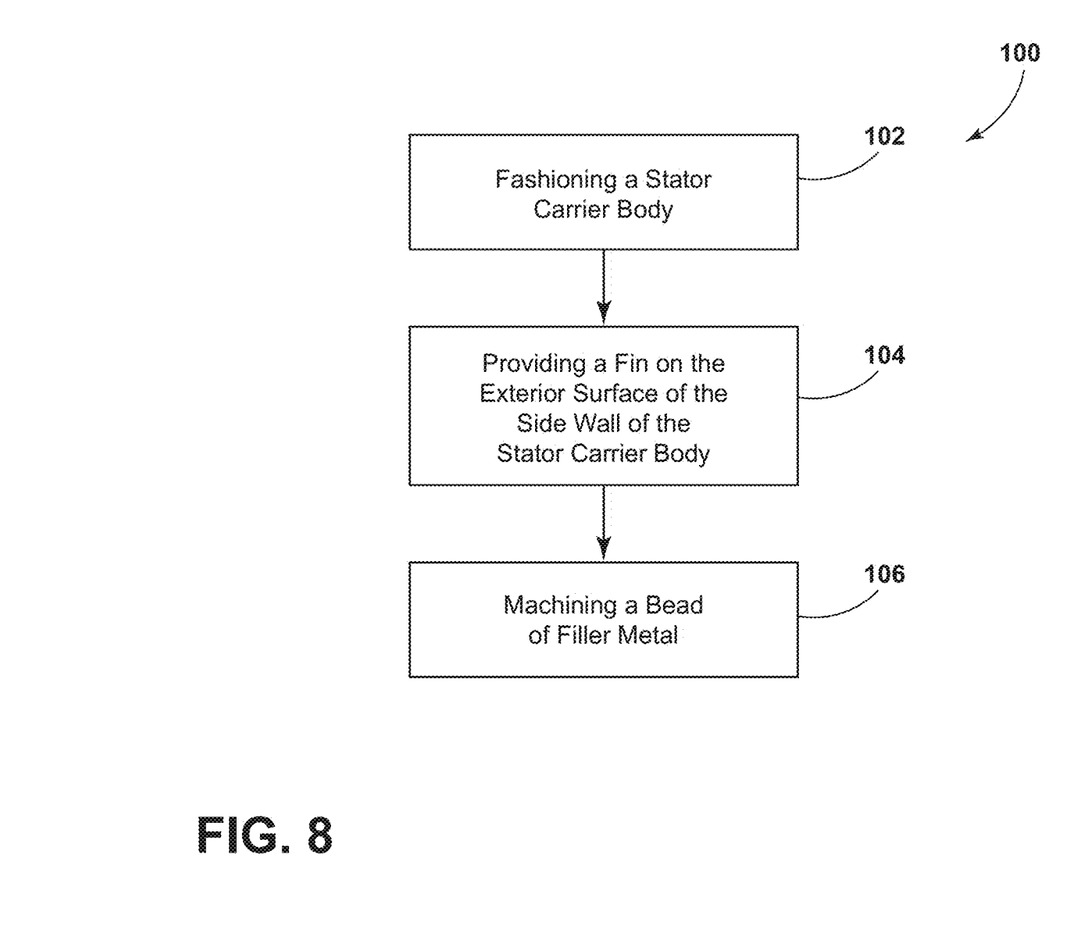
FIG. 8. is a flow diagram of a method of manufacturing a stator carrier.

Referring now to FIG. 8, a method 100 of manufacturing a stator carrier 10 includes the step 102 of fashioning a stator carrier body 12. The stator carrier body 12 fashioned in step 102 may include the side wall 14 that extends circumferentially about the hollow 16. The side wall 14 may include the interior surface 18 that defines the hollow 16 and the exterior surface 20 that is opposite the interior surface 18. In some implementations, the step 102 of fashioning the stator carrier body 12 may include stamping at least one metal component. In the embodiment illustrated in FIG. 5, the stator carrier body 12 is fashioned via stamping of a metal component. A variety of metals, such as aluminum and/or steel, are contemplated.

Referring still to FIG. 8, the method 100 of manufacturing the stator carrier 10 may include the step 104 of providing a fin 22 on the exterior surface 20 of the side wall 14 of the stator carrier body 12. The fin 22 provided on the exterior surface 20 of the side wall 14 at step 104 may be coupled to the exterior surface 20 of the side wall 14 and may extend axially and circumferentially along the exterior surface 20 of the side wall 14 in a winding fashion. As illustrated in FIG. 5, in some implementations, the fin 22 provided on the exterior surface 20 of the side wall 14 may be the spring 64. As such, the step 104 of providing the fin 22 on the exterior surface 20 of the side wall 14 of the stator carrier body 12 may include positioning the spring 64 about the exterior surface 20 of the side wall 14 such that the spring 64 is wound about the exterior surface 20 of the side wall 14. The spring 64 may be a metal wire that is actively coiled into a spring 64 about the exterior surface 20 of the side wall 14 in the step 104 of providing the fin 22 on the exterior surface 20 of the side wall 14. It is contemplated that the spring 64 may be wound into form before being positioned on the exterior surface 20 of the side wall 14 of the stator carrier body 12. In various implementations, the outer diameter of the exterior surface 20 of the side wall 14 is greater than an inner diameter of the spring 64 in the undeformed state of the spring 64, and the spring 64 is positioned about the exterior surface 20 of the side wall 14 via elastic deformation of the spring 64. In some implementations, the step 104 of providing a fin 22 on the exterior surface 20 of the side wall 14 further comprises brazing the spring 64 to the exterior surface 20 of the side wall 14 of the stator carrier body 12. In some implementations, the step 104 of providing a fin 22 on the exterior surface 20 of the side wall 14 further comprises welding the spring 64 to the exterior surface 20 of the side wall 14 of the stator carrier body 12.

Referring still to FIG. 8, the step 104 of providing a fin 22 on the exterior surface 20 of the side wall 14 may include depositing the bead 68 of filler metal onto the exterior surface 20 of the side wall 14. As illustrated in FIG. 6, the bead 68 of filler metal may be deposited on the exterior surface 20 of the side wall 14 at step 104, such that the bead 68 extends axially and circumferentially along the exterior surface 20 of the side wall 14 in a winding fashion. In various implementations, the step 104 of providing the fin 22 on the exterior surface 20 of the side wall 14 of the stator carrier body 12 may occur after the step 102 of fashioning the stator carrier body 12.

Referring still to FIG. 8, the method 100 of manufacturing a stator carrier 10 may include the step 106 of machining the bead 68 of filler metal. As illustrated in FIG. 7, the fin 22 of the stator carrier 10 in the form of the bead 68 of filler metal is machined to have a machined outer profile 70. The machining of at least a portion of the bead 68 of the filler metal may allow for an optimized distance between the fin 22 and the outer wall 34 of the housing 26 that defines the fluid jacket 54 with the stator carrier 10. Manufacturing the stator carrier 10 by depositing the bead 68 of filler metal may advantageously allow for a variety of fin 22 shapes on the exterior surface 20 of the side wall 14 due to the lack of constraints associated with typical manufacturing processes. For example, a welding torch that is attached to a multi-axis robot may be utilized, such that virtually any shape of fin 22 may be formed within the available degrees of freedom.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS 10 stator carrier
12 stator carrier body
14 side wall
16 hollow
18 interior surface
20 exterior surface
22 fin
24 electric drive unit
26 housing
28 motor region
30 gearbox region
32 motor
34 outer wall
36 bearing shield
38 central aperture
40 axis
42 rotor shaft
44 bearing
46 stator
48 rotor
50 flange
52 seal
54 fluid jacket
56 radially inboard terminus
58 fluid circuit
60 fluid inlet
62 fluid outlet
64 spring
66 locations
68 bead
70 outer profile
72 portion
74 first portion
76 second portion
78 first end
80 second end
82 third portion
100 method
102 step
104 step
106 step

What is claimed is:

1. A method of manufacturing a stator carrier, comprising the steps of:
   fashioning a stator carrier body that includes a side wall that extends circumferentially about a hollow, the side wall having an interior surface that defines the hollow and an exterior surface opposite the interior surface; and
   subsequently, providing a fin on the exterior surface of the side wall of the stator carrier body, wherein the fin is coupled to the exterior surface of the side wall and extends axially and circumferentially along the exterior surface of the side wall in a winding fashion, wherein the fin comprises:
      a first portion that extends in a winding fashion circumferentially in a first circumferential direction and axially toward a flange of the stator carrier body that extends radially outboard from the side wall;
      a second portion that extends axially from the first portion toward the flange of the stator carrier body; and
      a third portion that extends from the second portion circumferentially about the exterior surface of the side wall a second circumferential direction that is opposite the first circumferential direction.

2. The method of claim 1, wherein the fin comprises:
   a spring, and the step of providing a fin on the exterior surface of the side wall of the stator carrier body comprises positioning the spring about the exterior surface of the side wall such that the spring is wound about the exterior surface of the side wall.

3. The method of claim 2, wherein an outer diameter of the exterior surface of the side wall is greater than an inner diameter of the spring in an undeformed state of the spring, and the spring is positioned about the exterior surface of the side wall via elastic deformation of the spring.

4. The method of claim 2, wherein the step of providing a fin on the exterior surface of the side wall further comprises:
   brazing the spring to the exterior surface of the side wall of the stator carrier body.

5. The method of claim 2, wherein the step of providing a fin on the exterior surface of the side wall further comprises:
   welding the spring to the exterior surface of the side wall of the stator carrier body.

6. The method of claim 1, wherein step of providing a fin on the exterior surface of the side wall comprises:
   depositing a bead of filler metal onto the exterior surface of the side wall.

7. The method of claim 6, further comprising the step of:
   machining the bead of filler metal.

8. The method of claim 1, wherein the step of fashioning the stator carrier body comprises:
   stamping at least one metal component.

9. A stator carrier, comprising:
   a stator carrier body that includes a side wall that extends circumferentially about a hollow, the side wall having an interior surface that defines the hollow and an exterior surface opposite the interior surface; and
   a spring coupled to the exterior surface of the side wall and comprising:
      a first portion that extends in a winding fashion axially and circumferentially in a first circumferential direction;
      a second portion that extends axially away from the first portion; and
      a third portion that extends from the second portion circumferentially about the exterior surface of the side wall a second circumferential direction that is opposite the first circumferential direction.

10. The stator carrier of claim 9, wherein the spring is in an elastically deformed state, and an outer diameter of the exterior surface of the side wall along which the spring extends in the elastically deformed state is greater than an inner diameter of the spring in an undeformed state of the spring.

11. The stator carrier of claim 10, wherein interference between the spring and the exterior surface of the side wall of the stator carrier body due to the spring being resiliently biased toward undeformed state yieldingly maintains the position of the spring relative to the stator carrier body.

12. The stator carrier of claim 9, wherein the spring is coupled to the exterior surface of the side wall via brazing.

13. The stator carrier of claim 9, wherein the spring is welded to the exterior surface of the side wall.

14. The stator carrier of claim 9, wherein the first portion of the spring extends axially toward a flange of the stator carrier body that extends radially outboard from the side wall of the stator carrier body, and the second portion of the spring extends axially toward the flange of the stator carrier body.

15. The stator carrier of claim 9, wherein the stator carrier body includes at least one stamped metal component.

16. A stator carrier, comprising:
   a stator carrier body that includes a side wall that extends circumferentially about a hollow, the side wall having an interior surface that defines the hollow and an exterior surface opposite the interior surface; and
   a fin coupled to the exterior surface of the side wall and having a portion that extends axially in a first axial direction and circumferentially in a first circumferential direction along the exterior surface of the side wall in a winding fashion and a portion that extends axially in the first axial direction and circumferentially in a second circumferential direction opposite the first circumferential direction along the exterior surface of the side wall in a winding fashion.

17. The stator carrier of claim 16, wherein the fin is a bead of filler metal, and at least a portion of the bead of filler metal has a machined outer profile.

18. The stator carrier of claim 16, wherein the stator carrier body includes at least one stamped metal component, and the fin is a bead of filler metal that is fixed to the at least one stamped metal component.

19. The stator carrier of claim 16, wherein the fin is a spring coupled to the exterior surface of the side wall.

20. The stator carrier of claim 16, wherein the portion of the fin that extends axially in the first axial direction and circumferentially in the first circumferential direction is a first portion of the fin, the portion of the fin that extends axially in the first axial direction and circumferentially in the second circumferential direction is a third portion of the fin, and the fin comprises:
   a second portion that extends axially along the exterior surface of the side wall in the first axial direction from the first portion of the fin to the third portion of the fin.

* * * * *